United States Patent
Usui et al.

(12) 
(10) Patent No.: US 6,514,065 B2
(45) Date of Patent: Feb. 4, 2003

(54) MOTOR DRIVE APPARATUS FOR INJECTION MOLDING MACHINE

(75) Inventors: Kazuo Usui, Nagano (JP); Shuichi Arai, Nagano (JP); Syuichi Hokino, Nagano (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 50 days.

(21) Appl. No.: 09/819,727

(22) Filed: Mar. 29, 2001

(65) Prior Publication Data

US 2001/0026816 A1 Oct. 4, 2001

(30) Foreign Application Priority Data

Mar. 29, 2000 (JP) ........................... 2000-090612

(51) Int. Cl.[7] ............................................. B29C 45/80
(52) U.S. Cl. ..................................................... 425/162
(58) Field of Search ................................. 425/145, 149, 425/150, 162

(56) References Cited

U.S. PATENT DOCUMENTS 5,371,450 A * 12/1994 Hiraoka ....................... 425/145
5,552,690 A * 9/1996 Hiraoka ....................... 425/149
5,869,108 A * 2/1999 Hiraoka ....................... 425/145
6,244,848 B1 * 6/2001 Ito .............................. 425/149
6,340,439 B1 * 1/2002 Hiraoka ....................... 425/145
6,416,694 B1 * 7/2002 Ishikawa ..................... 425/145

FOREIGN PATENT DOCUMENTS

JP          A200037758          2/2000

* cited by examiner

*Primary Examiner*—Tim Heitbrink
(74) *Attorney, Agent, or Firm*—Birch, Stewart, Kolasch & Birch, LLP

(57) ABSTRACT

A motor drive apparatus for an injection molding machine includes a servo amplifier connected to a servomotor; a controller connected to the servo amplifier; and an interface unit for selectively connecting the controller to one of a plurality of different servo amplifiers. When the servomotor is to be replaced with another, different servomotor, the interface unit can cope with the replacement. Specifically, an interface printed circuit board corresponding to a servo amplifier for the replacement servomotor is selected from among a plurality of interface printed circuit boards which constitute the interface unit.

5 Claims, 3 Drawing Sheets

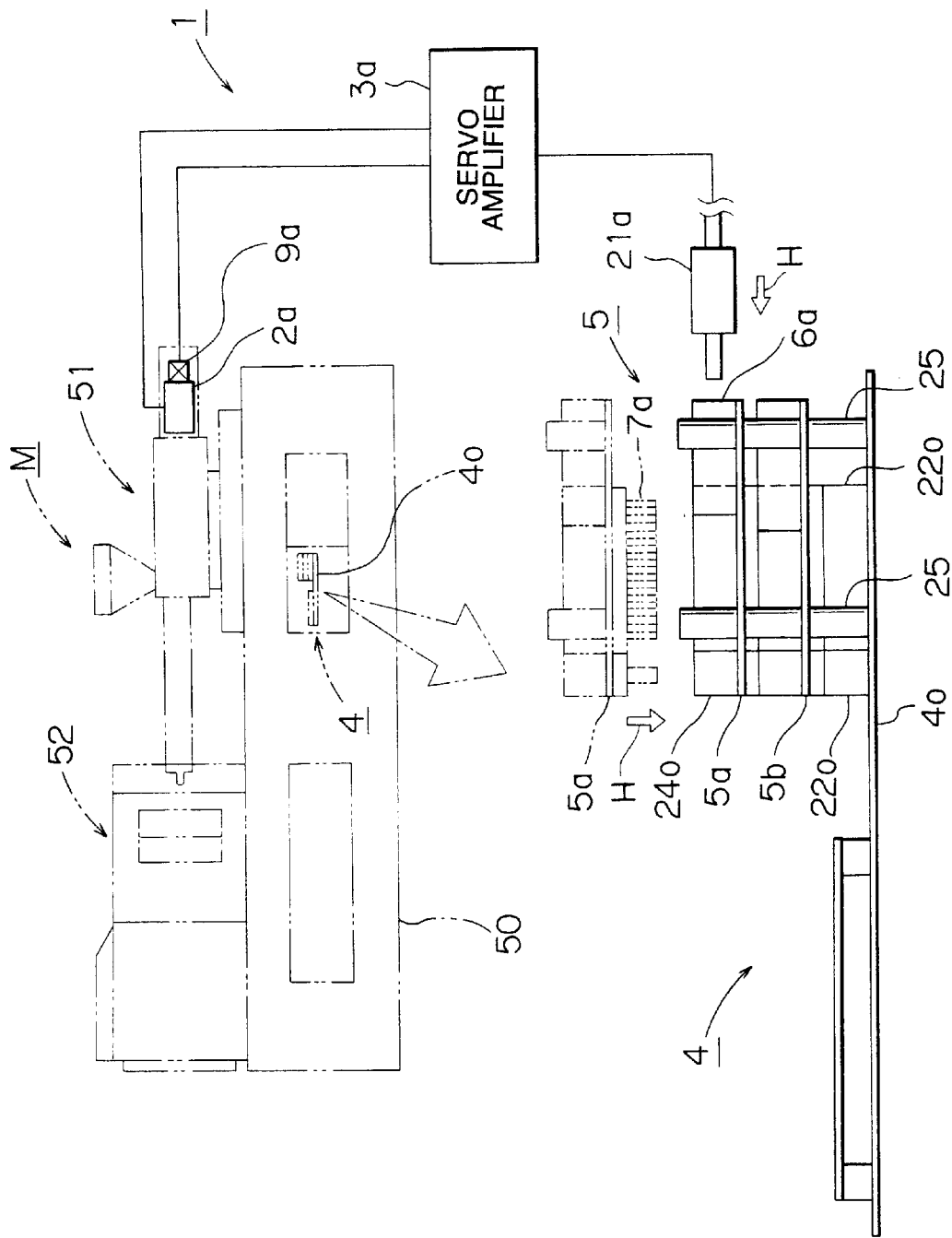

MOTOR DRIVE APPARATUS FOR INJECTION MOLDING MACHINE

BACKGROUND OF THE INVENTION

1. Field of the Invention

The present invention relates to a motor drive apparatus for an injection molding machine including a servo amplifier connected to a servomotor, and a controller connected to the servo amplifier.

2. Description of the Related Art

Generally, as disclosed in Japanese Patent Application Laid-Open (kokai) No. 2000-37758, a motor-driven injection molding machine includes a motor drive apparatus for driving a servomotor. The motor drive apparatus usually includes a servo amplifier connected to a servomotor, and a controller connected to the servo amplifier. The controller is designed for exclusive use with an injection molding machine and for exchange of various signals with a servomotor to be connected thereto.

Servomotors and servo amplifiers usually have versatility for use with various kinds of machinery and differ in specifications among manufacturers and models. As a result, conventionally, when a servomotor used with an injection molding machine is to be replaced with another servomotor of a different type, the controller must be modified in design accordingly, causing a significant increase in cost and involving additional man-hours for modification.

SUMMARY OF THE INVENTION

An object of the present invention is to provide a motor drive apparatus for an injection molding machine requiring no modification of design of a controller even when a servomotor is to be replaced with one of a different type, to thereby achieve a significant reduction in cost and a reduction in man-hours involved in the replacement.

Another object of the present invention is to provide a motor drive apparatus for an injection molding machine having enhanced adaptability and developability and capable of establishing a thin profile.

To achieve the above objects, the present invention provides a motor drive apparatus for an injection molding machine, comprising a servo amplifier connected to a servomotor; a controller connected to the servo amplifier; and an interface unit for selectively connecting the controller to one of a plurality of different servo amplifiers. Even when the servomotor is to be replaced with another, different servomotor, the interface unit can cope with the replacement without need of modification of design of the controller. Specifically, all that is required is selection, from among a plurality of interface printed circuit boards, of an interface printed circuit board corresponding to a servo amplifier for the replacement servomotor.

BRIEF DESCRIPTION OF THE DRAWINGS

FIG. 3 is a schematic view of an injection molding machine accompanied by a side view of the printed circuit board mounted in the motor drive apparatus.

DETAILED DESCRIPTION OF THE PREFERRED EMBODIMENT

Figure 1:
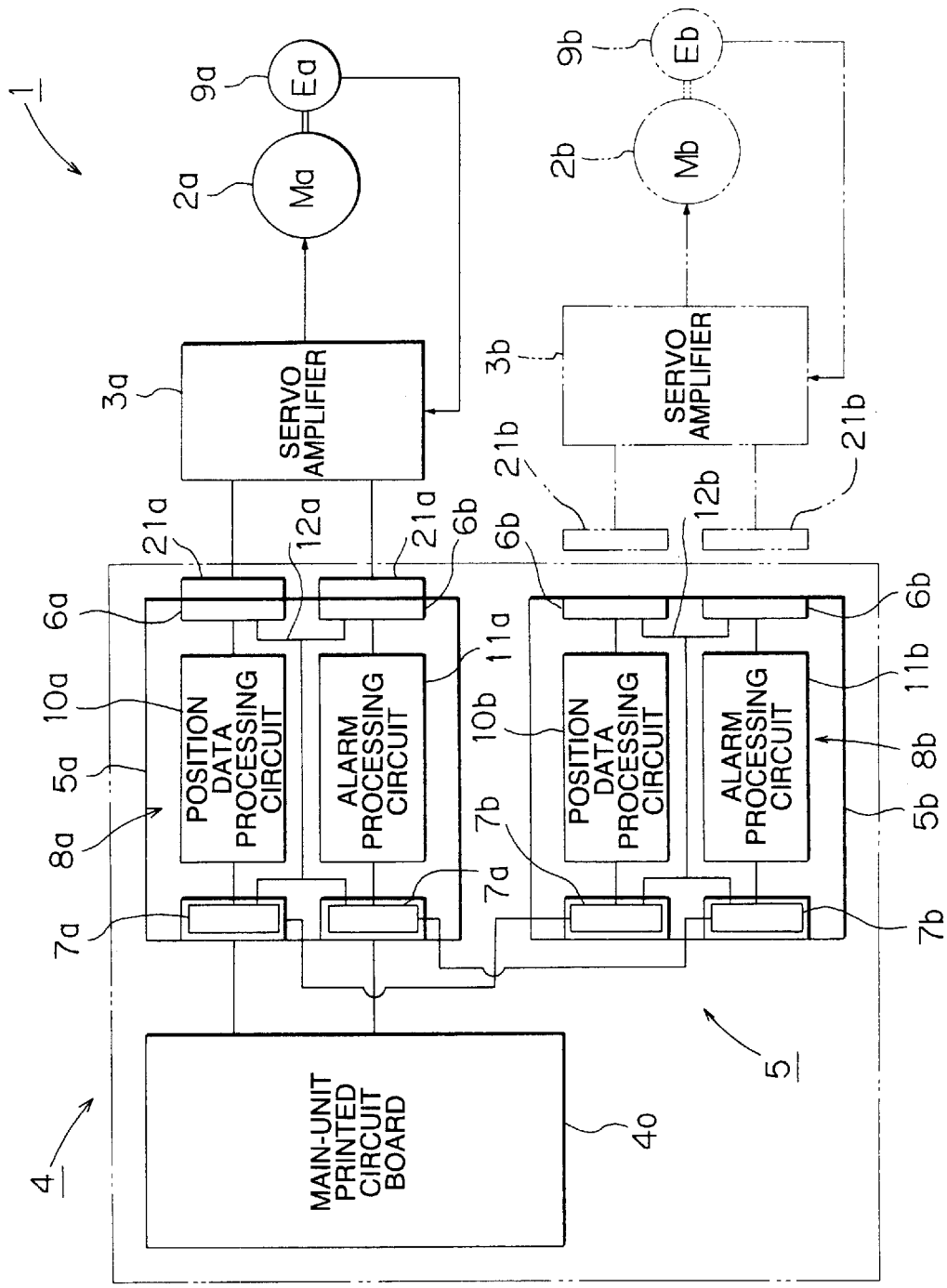
FIG. 1 is a block circuit diagram of a motor drive apparatus according to an embodiment of the present invention.

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, an injection molding machine M equipped with a motor drive apparatus 1 according to the embodiment will be briefly described with reference to FIG. 3.

In FIG. 3, reference letter M denotes an injection molding machine, which includes a base frame 50, an injection unit 51 disposed on the upper surface of the base frame 50 at one end of the upper surface, and a mold clamping apparatus 52 disposed on the upper surface at the other end of the same.

The injection unit 51 includes a servomotor 2a for reciprocating a screw and a measuring servomotor (not shown) for rotating the screw. The base frame 50 contains a controller 4. The controller 4 includes a main-unit printed circuit board (motherboard) 4o, which partially or entirely constitutes the controller 4. The main-unit printed circuit board 4o is connected to, for example, the servomotor 2a via a predetermined servo amplifier 3a. The servo amplifier 3a and the controller 4 constitutes the motor drive apparatus 1 for driving the servomotor 2a according to the present embodiment. The present invention (embodiment) enables easy replacement of the servomotor 2a with another servomotor, such as a servomotor 2b, which will be described later.

Figure 2:
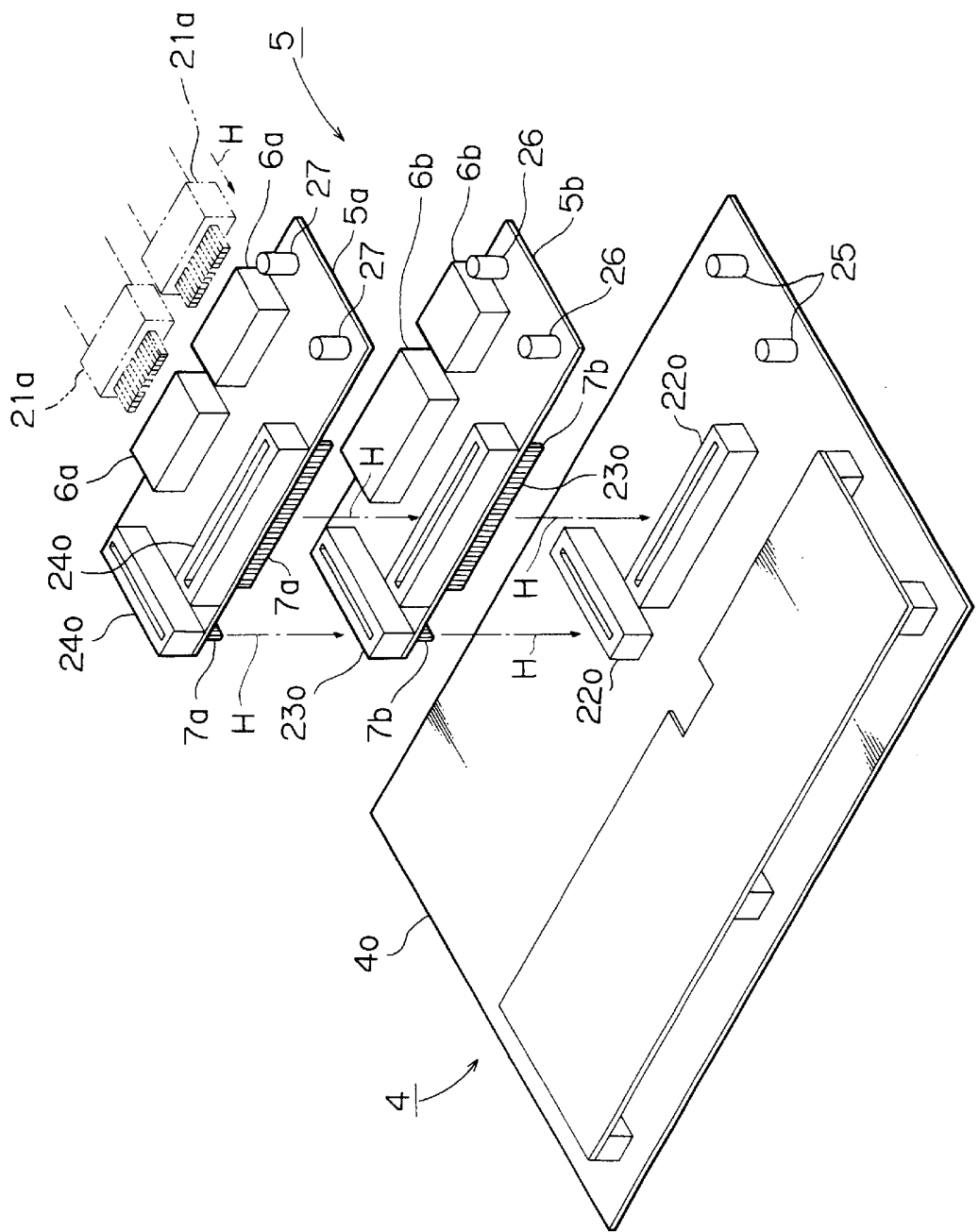
FIG. 2 is a schematic perspective view of a printed circuit board mounted in the motor drive apparatus.

Next, the configuration and usage of the motor drive apparatus 1 will be specifically described with reference to FIGS. 1 and 2.

The main-unit printed circuit board 4o is equipped with an interface unit 5. The interface unit 5 is adapted to selectively connect the controller 4 to one of two (generally, a plurality of) different servo amplifiers 3a and 3b and thus includes two (generally, a plurality of) interface printed circuit boards 5a and 5b corresponding to the two servo amplifiers 3a and 3b.

The interface printed circuit board 5a includes two input connectors (inlets) 6a for connection to the servo amplifier 3a; two output connectors (outlets) 7a for connection to the controller 4 (main-unit printed circuit board 4o); and a processing circuit section 8a for processing signals input from the input connectors 6a and outputting processed signals to the output connectors 7a. The processing circuit section 8a includes a position data processing circuit 10a for processing a position data signal obtained from a detection signal issued by an encoder 9a attached to the servomotor 2a; an alarm processing circuit 11a for processing an alarm signal output from the servo amplifier 3a; and a signal line 12a for directly transmitting signals input from the input connectors 6a to the output connectors 7a.

The other interface printed circuit board 5b includes two input connectors (inlets) 6b for connection to the servo amplifier 3b; two output connectors (outlets) 7b for connection to the controller 4 (main-unit printed circuit board 4o); and a processing circuit section 8b for processing signals input from the input connectors 6b and outputting processed signals to the output connectors 7b. The processing circuit section 8b includes a position data processing circuit 10b for processing a position data signal obtained from a detection signal issued by an encoder 9b attached to the servomotor 2b; an alarm processing circuit 11b for processing an alarm signal output from the servo amplifier 3b; and a signal line 12b for directly transmitting signals input from the input connectors 6b to the output connectors 7b.

The servo amplifier 3a can be connected to the interface printed circuit board 5a. The servo amplifier 3a includes output connectors (outlets) 21a for connection to the input connectors 6a. An output section of the servo amplifier 3a is connected to the servomotor 2a. The encoder 9a is attached to the servomotor 2a in order to detect the rotational speed of the servomotor 2a. The encoder 9a sends a detection signal to the servo amplifier 3a.

The servo amplifier 3b can be connected to the interface printed circuit board 5b. The servo amplifier 3b includes output connectors (outlets) 21b for connection to the input connectors 6b. An output section of the servo amplifier 3b is connected to the servomotor 2b. The encoder 9b is attached to the servomotor 2b in order to detect the rotational speed of the servomotor 2b. The encoder 9b sends a detection signal to the servo amplifier 3b.

Since the servomotor 2a and the servomotor 2b are different in specifications, the servo amplifiers 3a and 3b to be connected to the servomotors 2a and 2b, respectively, are different in specifications. Specifically, the servo amplifiers 3a and 3b are different in the format of a signal to be sent to the controller 4: i.e., different in signal transmission system and port type for transmission of a position data signal obtained from a detection signal issued by each of the encoders 9a and 9b, as well as different in signal transmission system and port type for transmission of an alarm signal output from the servo amplifiers 3a and 3b. The position data processing circuits 10a and 10b are adapted to convert respective received position data signals in different signal transmission systems and port types to respective position data signals in a common system and a common type for transmission therefrom. Similarly, the alarm processing circuits 11a and 11b are adapted to convert respective received alarm signals in different signal transmission systems and port types to respective alarm signals in a common system and a common type for transmission therefrom.

Both or either one of the interface printed circuit boards 5a and 5b can be mounted (connected) on the main-unit printed circuit board 4o. Specifically, as shown in FIG. 2, two connectors 22o are provided on the upper surface of the main-unit printed circuit board 4o at respectively predetermined positions. Two input connectors 23o are provided on the upper surface of the interface printed circuit board 5b at positions corresponding to those of the input connectors 22o. Two output connectors 7b are provided integral with the input connectors 23o in such a manner as to be projected through the interface printed circuit board 5b beyond the lower surface of the interface printed circuit board 5b. Ports of the output connectors 7b and those of the input connectors 23o are connected in common. The output connectors 7b can be inserted into the input connectors 22o to thereby mount (connect) the interface printed circuit board 5b onto the main-unit printed circuit board 4o. Similarly, two input connectors 24o are provided on the upper surface of the interface printed circuit board 5a at positions corresponding to those of the input connectors 23o. Two output connectors 7a are provided integral with the input connectors 24o in such a manner as to be projected through the interface printed circuit board 5a beyond the lower surface of the interface printed circuit board 5a. Ports of the output connectors 7a and those of the input connectors 24o are connected in common. The output connectors 7a can be inserted into the input connectors 23o to thereby mount (connect) the interface printed circuit board 5a onto the main-unit printed circuit board 4o. Reference numerals 25, 26, and 27 denote supports for fixedly supporting the interface printed circuit boards 5b and 5b and another interface printed circuit board, and the number thereof is not particularly limited.

In mounting on the main-unit printed circuit board 4o, the output connectors 7b of the interface printed circuit board 5b are inserted into the corresponding input connectors 22o of the main-unit printed circuit board 4o. Then, the output connectors 7a of the interface printed circuit board 5a are inserted into the corresponding input connectors 23o of the interface printed circuit board 5b. The interface printed circuit boards 5a and 5b can be reliably fixed in place, as needed, through screw engagement utilizing the supports 25, 26, and 27. FIG. 3 shows the assembled state of the main-unit printed circuit board 4o and the interface printed circuit boards 5a and 5b. The output connectors 7a and 7b of the interface printed circuit boards 5a and 5b, respectively, are connected in common to the input connectors 22o. In FIG. 3, symbol H denotes the direction of mounting.

Notably, the interface printed circuit boards 5a and 5b can be mounted together as mentioned above, or merely either one of the interface printed circuit boards 5a and 5b can be mounted. In this manner, the form of mounting can be selected according to application, thereby providing enhanced adaptability and developability. Even when a plurality of interface printed circuit boards 5a, 5b, etc. are mounted together, the total thickness does not become very thick, since the boards are superposed on one another.

When the servomotor 2a is to be used with the injection molding machine M, the output connectors 21a of the servo amplifier 3a are inserted into the input connectors 6a of the interface printed circuit board 5a for mounting (connection). When the servomotor 2a is to be replaced with the different servomotor 2b, the output connectors 21a of the servo amplifier 3a are disconnected from the input connectors 6a of the interface printed circuit board 5a. Then, the output connectors 21b of the servo amplifier 3b are inserted into the input connectors 6b of the other interface printed circuit board 5b for mounting (connection).

As described above, according to the motor drive apparatus 1 of the present embodiment, even when the servomotor 2 is to be replaced with the different servomotor 2b, what is required is to merely select the interface printed circuit board 5b corresponding to the servo amplifier 3b for the replacement servomotor 2b, without need of modification of design of the controller 4. Thus, cost and man-hours involved in replacement of the servomotor 2a to and from the servomotor 2b can be reduced significantly.

The present invention is not limited to the above-described embodiment. Regarding structural details (circuit configuration), shape, components, quantity, among others, modifications and any omission or addition may be possible as needed without departing from the scope of the invention. For example, the above embodiment is described while mentioning the interface unit 5 composed of the two interface printed circuit boards 5a and 5b. However, the number of interface printed circuit boards is not particularly limited. The interface unit 5 may include three or more interface printed circuit boards. Also, the above embodiment is described while mentioning the processing circuit section 8a (8b) composed of the position data processing circuit 10a (10b) and the alarm processing circuit 11a (11b). However, the processing circuits are not particularly limited. Other processing circuits may be employed.

What is claimed is:

1. A motor drive apparatus for driving a servomotor provided in an injection molding machine, comprising:
   a servo amplifier connected to said servomotor;
   a controller for controlling said servo amplifier; and
   an interface unit for connecting to said controller one of a plurality of different servo amplifiers which is selected to be used as said servo amplifier.

2. A motor drive apparatus for an injection molding machine according to claim 1, wherein said interface unit comprises a plurality of interface printed circuit boards to be mounted together or selectively on a main-unit printed circuit board of said controller.

3. A motor drive apparatus for an injection molding machine according to claim 2, wherein the interface printed circuit board comprises an input connector section to be connected to said servo amplifier, an output connector section to be connected to said controller, and a processing circuit section for processing a signal input from the input connector section and outputting a processed signal to the output connector section.

4. A motor drive apparatus for an injection molding machine according to claim 3, wherein the processing circuit section comprises a position data processing circuit for processing a position data signal obtained from a detection signal issued by an encoder attached to the servomotor.

5. A motor drive apparatus for an injection molding machine according to claim 3, wherein the processing circuit section comprises an alarm processing circuit for processing an alarm signal output from said servo amplifier.

* * * * *